(12) United States Patent
Hokoi

(10) Patent No.: US 9,764,729 B2
(45) Date of Patent: Sep. 19, 2017

(54) HYBRID VEHICLE

(71) Applicant: TOYOTA JIDOSHA KABUSHIKI KAISHA, Toyota-shi, Aichi-ken (JP)

(72) Inventor: Koji Hokoi, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/157,498

(22) Filed: May 18, 2016

(65) Prior Publication Data
US 2016/0339903 A1    Nov. 24, 2016

(30) Foreign Application Priority Data

May 20, 2015    (JP) .................................. 2015-102907

(51) Int. Cl.
| | |
|---|---|
| *B60W 20/00* | (2016.01) |
| *B60K 6/445* | (2007.10) |
| *B60W 20/13* | (2016.01) |
| *B60L 11/18* | (2006.01) |
| *B60W 50/08* | (2012.01) |
| *B60W 10/06* | (2006.01) |

(Continued)

(52) U.S. Cl.
CPC .............. *B60W 20/13* (2016.01); *B60K 6/445* (2013.01); *B60L 11/1862* (2013.01); *B60W 10/06* (2013.01); *B60W 10/08* (2013.01); *B60W 20/10* (2013.01); *B60W 50/082* (2013.01); *B60W 50/085* (2013.01); *B60W 2510/244* (2013.01); *Y02T 10/7005* (2013.01)

(58) Field of Classification Search
CPC .... B60W 20/13; B60W 20/10; B60W 50/085; B60W 50/082; B60W 10/06; B60W 10/08; B60W 2510/244; B60K 6/445; B60L 11/1862; Y02T 10/7005
See application file for complete search history.

(56) References Cited

U.S. PATENT DOCUMENTS

| | | | | |
|---|---|---|---|---|
| 7,746,026 | B2* | 6/2010 | Koziara | B60L 3/0046 320/104 |
| 2010/0145560 | A1* | 6/2010 | Komatsu | B60K 6/365 701/22 |

(Continued)

FOREIGN PATENT DOCUMENTS

| | | |
|---|---|---|
| JP | 2010-241396 | * 10/2010 |
| JP | 2011-230678 A | 11/2011 |

(Continued)

*Primary Examiner* — Michael J Zanelli
(74) *Attorney, Agent, or Firm* — Andrews Kurth Kenyon LLP

(57) ABSTRACT

An ECU selects a CS mode when an SOC of a power storage device becomes smaller than a threshold value during a CD mode being selected. The ECU allows switching to the CD mode when the SOC exceeds a CD mode allowance SOC threshold value which is greater than the threshold value during the CS mode being selected. When an increase in the SOC is requested by means of an SOC restoration switch, the ECU executes an SOC restoration control. The CD mode allowance SOC threshold value in a case where an increase in the SOC is requested by means of the SOC restoration switch is smaller than the threshold value in a case where an increase in the SOC is not requested by means of the SOC restoration switch.

7 Claims, 8 Drawing Sheets

(51) Int. Cl.
*B60W 10/08* (2006.01)
*B60W 20/10* (2016.01)

(56) References Cited

U.S. PATENT DOCUMENTS

| | | | | |
|---|---|---|---|---|
| 2011/0190968 A1* | 8/2011 | Fleming | ............... | G06F 19/00 |
| | | | | 701/22 |
| 2013/0030635 A1* | 1/2013 | Morita | ............... | B60K 6/445 |
| | | | | 701/22 |
| 2015/0291145 A1* | 10/2015 | Yu | ............... | B60W 10/06 |
| | | | | 701/22 |
| 2016/0159337 A1 | 6/2016 | Hisano | | |
| 2016/0252069 A1 | 9/2016 | Teraya et al. | | |

FOREIGN PATENT DOCUMENTS

| | | | |
|---|---|---|---|
| JP | 2013-049381 A | 3/2013 |
| JP | 2014-217179 A | 11/2014 |
| JP | 2015-020651 A | 2/2015 |
| JP | 2015-077867 A | 4/2015 |

\* cited by examiner

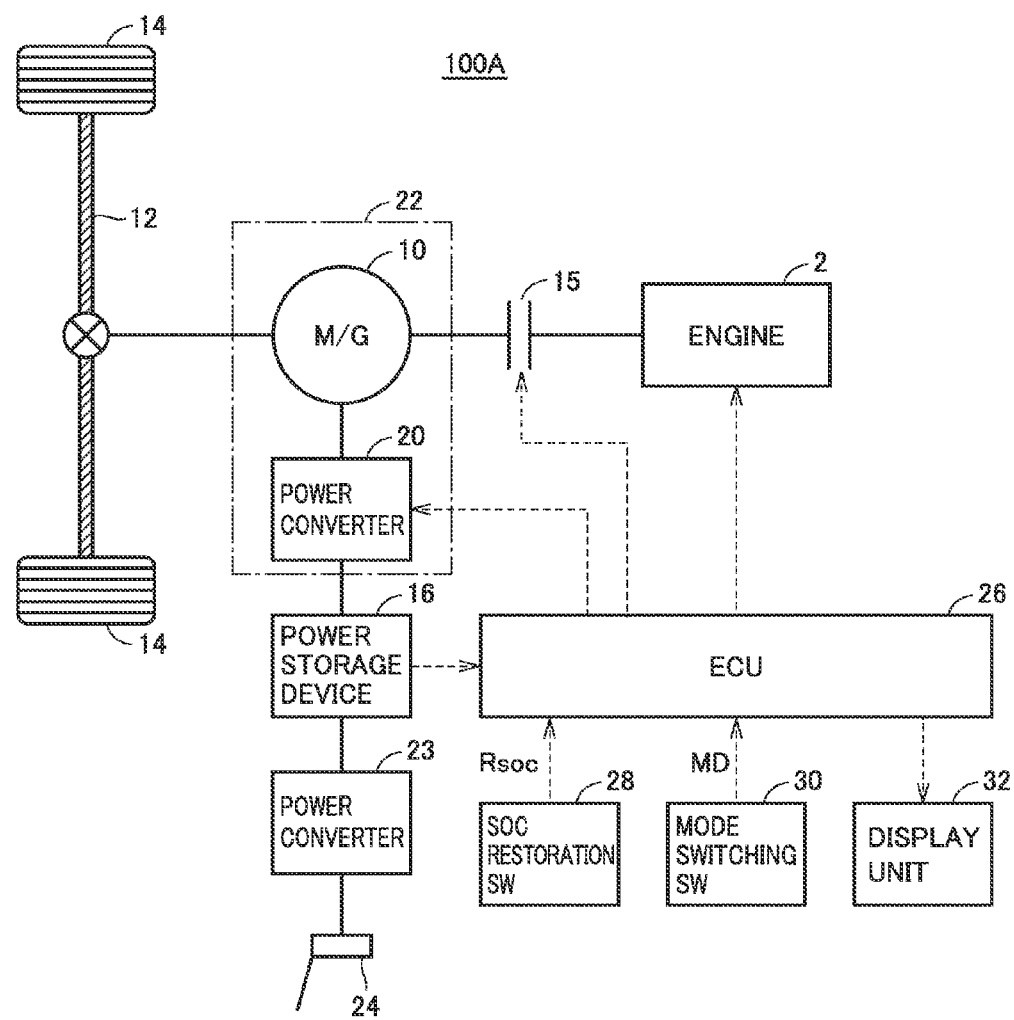

HYBRID VEHICLE

This nonprovisional application is based on Japanese Patent Application No. 2015-102907 filed on May 20, 2015 with the Japan Patent Office, the entire contents of which are hereby incorporated by reference.

BACKGROUND OF THE INVENTION

Field of the Invention

The present invention relates to a hybrid vehicle, and more particularly to a hybrid vehicle including an internal combustion engine, a power storage device, and a motor which is configured to receive a supply of electric power from the power storage device and generate a traveling driving force.

Description of the Background Art

Japanese Patent Laying-Open No. 2013-49381 discloses a hybrid vehicle having a CD (Charge Depleting) mode and a CS (Charge Sustaining) mode. The CD mode is a mode of proactively consuming an SOC (State Of Charge) of a power storage device by mainly performing EV (Electric Vehicle) traveling while allowing HV (Hybrid Vehicle) traveling. The CS mode is a mode of appropriately performing switching between the HV traveling and the EV traveling to control the SOC within a predetermined range. It should be noted that the EV traveling is the traveling of stopping an engine and using only a motor generator, and the HV traveling is the traveling of operating an engine.

In this hybrid vehicle, when the SOC becomes less than or equal to a CS mode threshold value during the CD mode being selected, switching from the CD mode to the CS mode is performed. When the SOC is raised to a CD mode threshold value which is higher than the CS mode threshold value during the CS mode being selected, switching from the CS mode to the CD mode is performed (refer to Japanese Patent Laying-Open NO. 2013-49381).

In the hybrid vehicle disclosed in Japanese Patent Laying-Open No. 2013-49381 described above, frequent switching between the CD mode and the CS mode is prevented by increasing the CD mode threshold value to be greater than the CS mode threshold value.

Here, there is a case where, in order to perform switching from the CS mode to the CD mode in accordance with a request from a user, an input device configured to allow a user to request an increase in the SOC of the power storage device is provided. However, when the input device is operated by a user, there is a possibility that it takes a long time to raise the SOC to the CD mode threshold value, and expectations of a user who requests early switching to the CD mode cannot be met.

SUMMARY OF THE INVENTION

The present invention was made to solve the problem described above, and its object is to provide a hybrid vehicle capable of achieving early switching to the CD mode in a case where switching from the CS mode to the CD mode is performed in accordance with a user's request.

According to the present invention, a hybrid vehicle includes an internal combustion engine, a power storage device, a motor, a control device, a power generating device, and an input device. The motor receives a supply of electric power from the power storage device and generates a traveling driving force. The control device performs switching between a CD mode and a CS mode. The control device allows switching to the CD mode when a state quantity indicating a state of charge (SOC) of the power storage device exceeds a threshold value during the CS mode being selected. The power generating device generates charging power for the power storage device by using an output of the internal combustion engine. The input device (SOC restoration switch) is configured to allow a user to request an increase in a power storage amount of the power storage device. When an increase in the power storage amount is requested by means of the input device, the control device executes an increase control (SOC restoration control) that actuates the power generating device to increase the power storage amount. Here, the threshold value in a case where an increase in the power storage amount is requested by means of the input device is smaller than the threshold value in a case where an increase in the power storage amount is not requested by means of the input device.

With such a configuration, when an increase in the power storage amount of the power storage device is requested by means of the input device, switching from the CS mode to the CD mode is allowed earlier as compared to the case where the input device is not operated. Thus, according to the present invention, a hybrid vehicle can be provided which is capable of achieving early switching to the CD mode in a case where switching from the CS mode to the CD mode is performed in accordance with a user's request.

Preferably, the control device performs switching from the CS mode to the CD mode when the state quantity (SOC) exceeds the threshold value during the CS mode being selected.

With such a configuration, when an increase in the power storage amount of the power storage device is requested by means of the input device, early switching from the CS mode to the CD mode can be achieved as compared to the case where the input device is not operated.

Preferably, the hybrid vehicle further includes another input device (mode switching switch). The another input device is configured to allow a user to request switching between the CD mode and the CS mode. When the state quantity (SOC) exceeds the threshold value during the CS mode being selected, and switching from the CS mode to the CD mode is requested by means of the another input device, the control device executes switching from the CS mode to the CD mode.

Also with such a configuration, when an increase in the power storage amount of the power storage device is requested by means of the input device, early switching from the CS mode to the CD mode can be achieved as compared to the case where the input device is not operated.

Preferably, when the state quantity (SOC) exceeds the threshold value, and termination of the request to increase the power storage amount is instructed, the control device terminates the above-described increase control and executes switching from the CS mode to the CD mode.

With such a configuration, in conjunction with the instruction to terminate the request to increase the power storage amount, the above-described increase control is terminated, and switching from the CS mode to the CD mode is executed. Thus, according to the present invention, convenience for a user is improved.

According to the present invention, a hybrid vehicle includes an internal combustion engine, a power storage device, a motor, a control device, a power generating device, and an input device. The motor receives a supply of electric power from the power storage device and generates a traveling driving force. The control device performs switching between a CD mode and a CS mode. The control device allows switching to the CD mode when a state quantity indicating a state of charge (SOC) of the power storage device exceeds a threshold value during the CS mode being selected. The power generating device generates charging power for the power storage device by using an output of the internal combustion engine. The input device (SOC restoration switch) is configured to allow a user to request an increase in the power storage amount of the power storage device. Here, the threshold value in a case where an operation history of the input device is present after previous switching from the CD mode to the CS mode is smaller than the threshold value in a case where an operation history of the input device is not present.

With such a configuration, also in a case where the CS mode is once maintained after termination of the increase control of the power storage amount of the power storage device (SOC restoration control) in accordance with an operation of the input device, and a switching request to the CD mode is present thereafter, early switching to the CD mode may be achieved.

Preferably, the hybrid vehicle further includes another input device (mode switching switch). The another input device is configured to allow a user to request switching between the CD mode and the CS mode. When the state quantity (SOC) exceeds the threshold value during the CS mode being selected, and switching from the CS mode to the CD mode is requested by means of the another input device, the control device executes switching from the CS mode to the CD mode.

With such a configuration, early switching from the CS mode to the CD mode can be achieved in accordance with an operation of the another input device.

Preferably, the hybrid vehicle further includes a charging mechanism configured to charge the power storage device with use of electric power from a power supply provided outside of the vehicle.

According to the present invention, fuel consumption in the CD mode can be improved using electric power supplied from the power supply provided outside of the vehicle.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a block diagram illustrating a modified example of the entire configuration of the hybrid vehicle.

DESCRIPTION OF THE PREFERRED EMBODIMENTS

Figure 1:
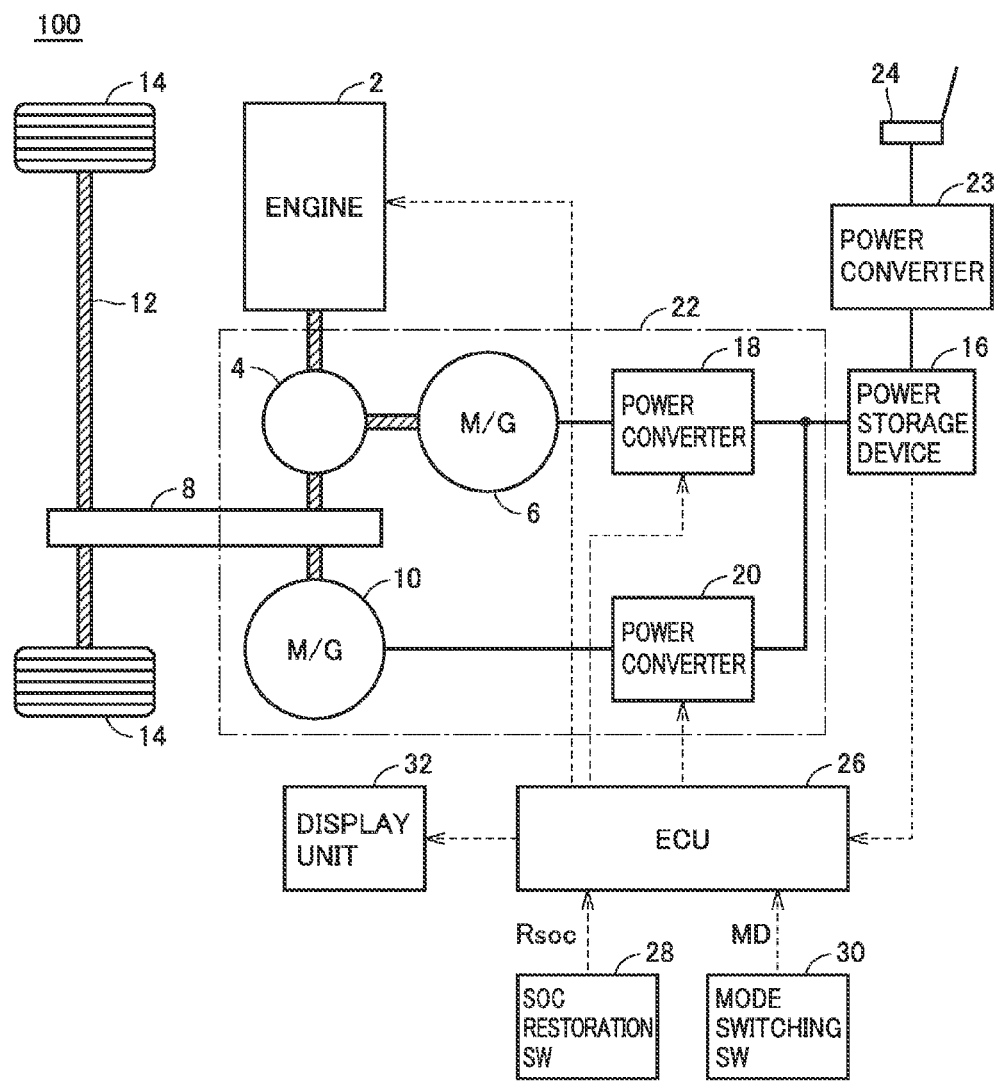
FIG. 1 is a block diagram for illustrating an entire configuration of a hybrid vehicle in accordance with a first embodiment of the present invention.

Hereinafter, embodiments of the present invention will be described in detail with reference to the drawings. In the following, a plurality of embodiments will be described. However, appropriate combinations of the configurations illustrated in the embodiments were intended originally from the filing of the application. It should be noted that the same or corresponding parts in the drawings have the same reference numerals allotted, and description thereof will not be repeated.

First Embodiment

FIG. 1 is a block diagram for illustrating an entire configuration of a hybrid vehicle in accordance with a first embodiment of the present invention. Referring to FIG. 1, a hybrid vehicle 100 includes an engine 2, a driving device 22, a transmission gear 8, a drive shaft 12, wheels 14, a power storage device 16, a power converter 23, a connection portion 24, and an ECU (Electronic Control Unit) 26. Moreover, hybrid vehicle 100 further includes an SOC restoration switch 28, a mode switching switch 30, and a display unit 32.

Engine 2 is an internal combustion engine configured to convert thermal energy generated by combustion of fuel into kinetic energy of moving elements such as a piston and a rotor and output a motive power. As the fuel for engine 2, it is preferable to employ hydrocarbon-based fuel such as gasoline, petrol, ethanol, liquid hydrogen, natural gas, natural gas and the like, or hydrogen fuel in a liquid or gas form.

Driving device 22 includes a power split device 4, motor generators 6, 10, and power converters 18, 20. Motor generators 6, 10 are alternating current electric rotating machines which are, for example, three-phase alternating current synchronous motors having a permanent magnet provided in a rotor. Motor generator 6 is used as a generator driven by engine 2 via power split device 4, and is used also as a motor for starting engine 2. Motor generator 10 mainly operates as a motor and drives a drive shaft 12. On the other hand, at the time of braking of the vehicle or at the time of reducing acceleration on a downward slope, motor generator 10 operates as a generator and performs regenerative power generation.

Power split device 4 includes a planetary gear mechanism having three rotational shafts of, for example, a sun gear, a carrier, and a ring gear. Power split device 4 splits the driving force of engine 2 into motive power transmitted to the rotational shaft of motor generator 6 and motive power transmitted to transmission gear 8. Transmission gear 8 is coupled to drive shaft 12 for driving wheels 14. Moreover, transmission gear 8 is coupled also to the rotational shaft of motor generator 10.

Power storage device 16 is a rechargeable direct current power supply which is constituted of, for example, a rechargeable battery such as a nickel hydride battery or a lithium-ion battery, a large capacity capacitor, and the like. Power storage device 16 supplies electric power to power converters 18, 20. Moreover, at the time of power generation by motor generators 6 and/or 10, power storage device 16 receives generated power and is charged. Further, power storage device 16 may receive electric power supplied from a power supply provided outside of the vehicle via connection portion 24, and be charged.

It should be noted that a state of charge of power storage device 16 is indicated by, for example, an SOC representing, by percentage, a current power storage amount with respect to a fully charged state of power storage device 16. The SOC is calculated, for example, based on a voltage and/or an input/output current of power storage device 16 detected by a voltage sensor and/or a current sensor not illustrated in the drawings. The SOC may be calculated by means of an ECU provided separately in power storage device 16, or may be calculated by means of ECU 26 based on a detection value of a voltage and/or an input/output current of power storage device 16.

Power converter 18 performs bidirectional DC/AC power conversion between motor generator 6 and power storage device 16 based on a control signal received from ECU 26. Similarly, power converter 20 performs bidirectional DC/AC power conversion between motor generator 10 and power storage device 16 based on a control signal received from ECU 26. Accordingly, motor generators 6, 10 can output positive torque for operation as a motor or negative torque for operation as a power generator along with transmission/receipt of electric power with respect to power storage device 16. Power converters 18, 20 are constituted of, for example, inverters. It should be noted that a voltage-boosting converter for the DC voltage conversion may be arranged between power storage device 16 and power converters 18, 20.

Power converter 23 converts electric power from a power supply (not shown) which is provided outside of the vehicle and electrically connected to connection portion 24 (hereinafter, also referred to as "external power supply") into a voltage level of power storage device 16 and outputs the same to power storage device 16 (hereinafter, charging of power storage device 16 by means of the external power supply is also referred to as "external charging"). Power converter 23 is constituted of, for example, a rectifier and an inverter. It should be noted that a way of receiving power from the external power supply is not limited to contact power reception with use of connection portion 24. The power reception may be performed in a contactless manner from the external power supply with use of a power reception coil or the like in place of connection portion 24.

ECU 26 includes a CPU (Central Processing Unit), a storage device, an input-output buffer, and the like (none of which is shown) and performs a control with respect to each device in hybrid vehicle 100. It should be noted that these controls are not limited to processing by means of software, and can be processed with dedicated hardware (electronic circuit).

As one of main controls executed by ECU 26, ECU 26 executes a traveling control of controlling traveling of the vehicle by selectively applying a CD mode of proactively consuming the SOC of power storage device 16 by mainly performing EV traveling while allowing HV traveling, and a CS mode of controlling the SOC within a predetermined range by appropriately performing switching between the HV traveling and the EV traveling.

Figure 2:
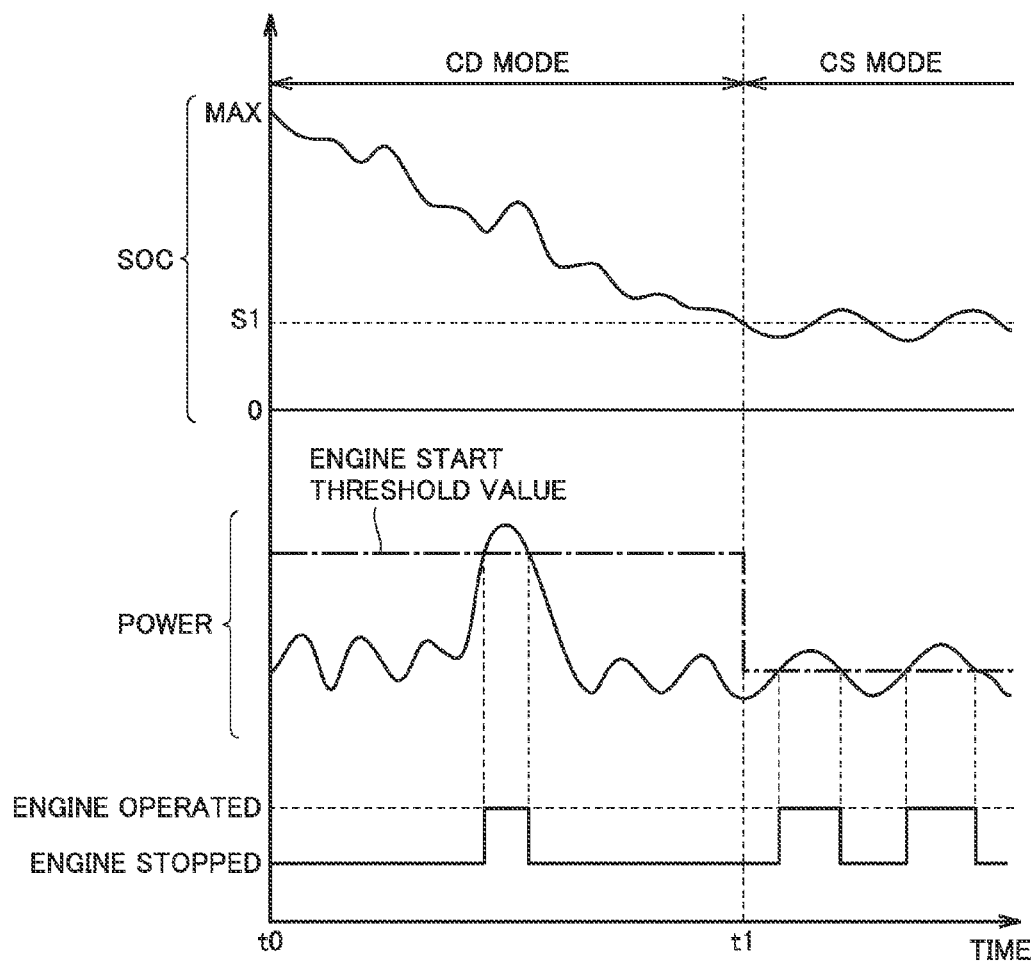
FIG. 2 is a diagram for illustrating a CD mode and a CS mode.

FIG. 2 is a diagram for illustrating the CD mode and the CS mode. Referring to FIG. 2, it is assumed that, after power storage device 16 is fully charged (SOC=MAX) by external charging by means of the external power supply, traveling is started in the CD mode (time t0).

The CD mode is a mode of proactively consuming the SOC of power storage device 16, and electric power (mainly the electrical energy by the external charging) stored in power storage device 16 is basically consumed. During the traveling in the CD mode, operation of engine 2 for maintaining the SOC is not performed. Accordingly, even though the SOC is increased temporarily by regenerative power collected at the time of deceleration of the vehicle or by electric power generated in accordance with operation of engine 2, a ratio of discharging becomes relatively greater than a ratio of charging as a result, so that the SOC is reduced as a whole in accordance with an increase in the traveling distance.

The CS mode is a mode of controlling the SOC of power storage device 16 within a predetermined range. As one example, at time t1, when the SOC is lowered to a threshold value S1 indicating lowering of the SOC, the CS mode is selected, and thereafter the SOC is maintained within a predetermined range. Specifically, engine 2 is operated (HV traveling) when the SOC is lowered, and engine 2 is stopped (EV traveling) when the SOC is raised. In other words, engine 2 is operated to maintain the SOC in the CS mode.

In this hybrid vehicle 100, when the traveling power is smaller than a predetermined engine start threshold value, engine 2 is stopped, and traveling is performed by means of motor generator 10 (EV traveling). On the other hand, when the traveling power exceeds the above-described engine start threshold value, engine 2 is operated for traveling (HV traveling). During the HV traveling, in addition to the driving force of motor generator 10, or in place of motor generator 10, hybrid vehicle 100 travels with use of the driving force of engine 2. The electric power generated by motor generator 6 in accordance with the operation of engine 2 during the HV traveling is directly supplied to motor generator 10 or stored in power storage device 16.

It should be noted that the engine start threshold value in the CD mode is preferably set to be greater than the engine start threshold value in the CS mode. In other words, the region in which hybrid vehicle 100 performs the EV traveling in the CD mode is preferably set to be greater than the region in which hybrid vehicle 100 performs the EV traveling in the CS mode. Accordingly, in the CD mode, the frequency of operating engine 2 is suppressed, so that the opportunity of the EV traveling is further extended as compared to the CS mode. On the other hand, in the CS mode, a control can be performed so as to allow hybrid vehicle 100 to travel efficiently with use of both engine 2 and motor generator 10.

Also in the CD mode, when the traveling power exceeds the engine start threshold value, engine 2 may be operated. It should be noted that there is a case where operation of engine 2 such as warm up of engine 2 or an exhaust catalyst is allowed even when the traveling power does not exceed the engine start threshold value. On the other hand, also in the CS mode, engine 2 may be stopped when the SOC is raised. In other words, the CD mode is not limited to the EV traveling of traveling while always stopping engine 2, and the CS mode is also not limited to the HV traveling of traveling while always operating engine 2. The EV traveling and the HV traveling may be performed in both the CD mode and the CS mode.

It should be noted that, as described above, when the SOC becomes smaller than threshold value S1 during the CD mode being selected, the mode is switched from the CD mode to the CS mode. On the other hand, although it is not illustrated in this FIG. 2, when the SOC is raised to a threshold value S2 which is higher than threshold value S1

(the SOC may be raised at the time of reduction of the acceleration on a downward slope or by the SOC restoration control by operation of an SOC restoration switch 28 described later), switching from the CS mode to the CD mode is allowed (switching to the CD mode can be performed by means of a mode switching switch 30 described later). Switching from the CS mode to the CD mode in accordance with the rise in the SOC will be described later in detail.

Referring again to FIG. 1, when ECU 26 receives a request signal Rsoc from SOC restoration switch 28, ECU 26 executes a charging control (SOC restoration control) using engine 2 and motor generator 6 so that the charging amount (SOC) of power storage device 16 increases. This SOC restoration control is a control of raising a control center of the SOC to be higher than a normal time (at the time when the SOC restoration control is not executed) or raising a charging rate (charging amount per unit time) of power storage device 16 to be higher than the normal time, and it is different from the charging control for setting the SOC to be within a predetermined range in the CS mode.

SOC restoration switch 28 is an input device configured to allow a user to request an increase in the power storage amount (SOC) of power storage device 16. To prepare for switching from the CS mode to the CD mode through operation of mode switching switch 30 (described later) provided separately, a user can request an increase in the SOC with respect to the vehicle by operating SOC restoration switch 28. When SOC restoration switch 28 is operated by a user, request signal Rsoc is outputted from SOC restoration switch 28 to ECU 26. It should be noted that a user can request an increase in the SOC by using sound input means or the like in place of SOC restoration switch 28.

Here, when an increase in the SOC is requested by means of SOC restoration switch 28, ECU 26 executes the above-described SOC restoration control, and lowers a threshold value of the SOC for allowing switching from the CS mode to the CD mode (hereinafter, also referred to as "CD mode allowance SOC threshold value") from a value S2 to a value S3 (S3>S1) as compared to the case where an increase in the SOC is not requested by means of SOC restoration switch 28.

In other words, as described above, when the SOC becomes smaller than threshold value S1 during the CD mode being selected, the mode is switched from the CD mode to the CS mode. Then, when the SOC is raised to the CD mode allowance SOC threshold value which is greater than threshold value S1, switching from the CS mode to the CD mode is allowed (it can be actually switched instead of allowing the switching). Accordingly, by setting threshold value S1 and the CD mode allowance SOC threshold value which is greater than threshold value S1, frequent switching between the CD mode and the CS mode is prevented.

However, for example, when a user requests switching to the CD mode and operates SOC restoration switch 28 for traveling on a residential street or the like during the CS mode being selected, it may take a long time to raise the SOC to the CD mode allowance SOC threshold value, and there is a possibility that the expectation of the user requesting early switching to the CD mode cannot be met.

Therefore, in hybrid vehicle 100 in accordance with this first embodiment, when an increase in the SOC of power storage device 16 is requested by means of SOC restoration switch 28, ECU 26 executes the above-described SOC restoration control, and sets the above-described CD mode allowance SOC threshold value to be smaller as compared to the case where an increase in the SOC is not requested by means of SOC restoration switch 28. Accordingly, when an increase in the SOC is requested by means of SOC restoration switch 28, early switching from the CS mode to the CD mode is allowed as compared to the case where SOC restoration switch 28 is not operated. Thus, when switching from the CS mode to the CD mode is performed in accordance with a user's request, early switching to the CD mode can be achieved.

Mode switching switch 30 is an input device configured to allow a user to request switching between the CD mode and the CS mode. Even when the SOC is not lowered to threshold value S1, a user can switch the mode from the CD mode to the CS mode by operating mode switching switch 30. Moreover, when the SOC exceeds CD mode allowance SOC threshold value, a user can switch the mode from the CS mode to the CD mode by operating mode switching switch 30. As described above, when an increase in the SOC is requested by means of SOC restoration switch 28, the CD mode allowance SOC threshold value is lowered. Therefore, a user can perform early switching from the CS mode to the CD mode by operating mode switching switch 30.

When the SOC exceeds the threshold value during the CS mode being selected, display unit 32 informs a user that switching to the CD mode is allowed. By display of this display unit 32, a user can operate mode switching switch 30 to switch the mode from the CS mode to the CD mode. It should be noted that, not only informing that switching to the CD mode is allowed, but also the travelable distance in the CD mode may be calculated by ECU 26 based on the SOC, and the travelable distance in the CD mode may be displayed by display unit 32 when the SOC exceeds the CD mode allowance SOC threshold value during the CS mode being selected. It should be noted that, in place of the travelable distance in the CD mode, the EV travelable distance may be displayed. It should be noted that in place of the visual display by display unit 32, notification may be provided to a user by means of sound or the like.

Figure 3:
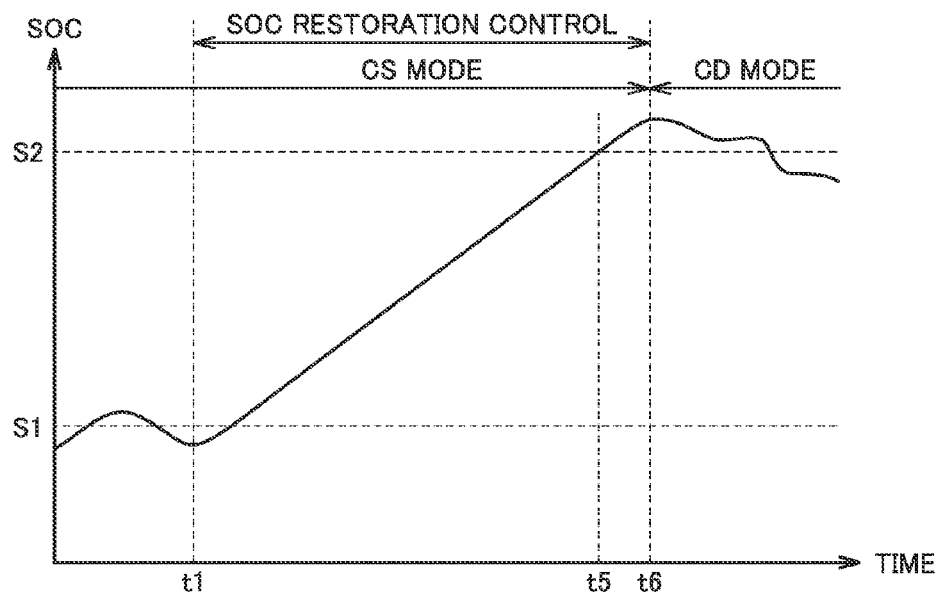
FIG. 3 is a diagram representing, as a reference example, one example of a change in the SOC in related art when an SOC restoration switch is operated during the CS mode being selected.

Next, one example of a change in the SOC when SOC restoration switch 28 is operated during the CS mode being selected will be shown. FIG. 3 is a diagram representing, as a reference example, one example of a change in the SOC in related art when SOC restoration switch 28 is operated during the CS mode being selected. Referring to FIG. 3, it is assumed that SOC restoration switch 28 is operated by a user at time t1 during the CS mode being selected.

When engine 2 is stopped, engine 2 is started, and the SOC restoration control using engine 2 and motor generator 6 is executed. By execution of the SOC restoration control, motor generator 6 is driven by engine 2 and generates electric power, and the generated electric power is stored in power storage device 16, so that the SOC of power storage device 16 is raised.

When the SOC of power storage device 16 exceeds threshold value S2 (S2>S1) at time t5, switching from the CS mode to the CD mode is allowed, and it is displayed on display unit 32 (FIG. 1). Then, when a user operates mode switching switch 30 to request switching from the CS mode to the CD mode at time t6, the SOC restoration control is terminated, and the CD mode is selected.

It should be noted that, although it is not particularly illustrated, a value of the SOC (greater than threshold value S2) which automatically terminates the SOC restoration control is set separately. When mode switching switch 30 is not operated after the switching from the CS mode to the CD mode is allowed, and the SOC reaches the above-described value, the SOC restoration control is terminated.

Figure 4:
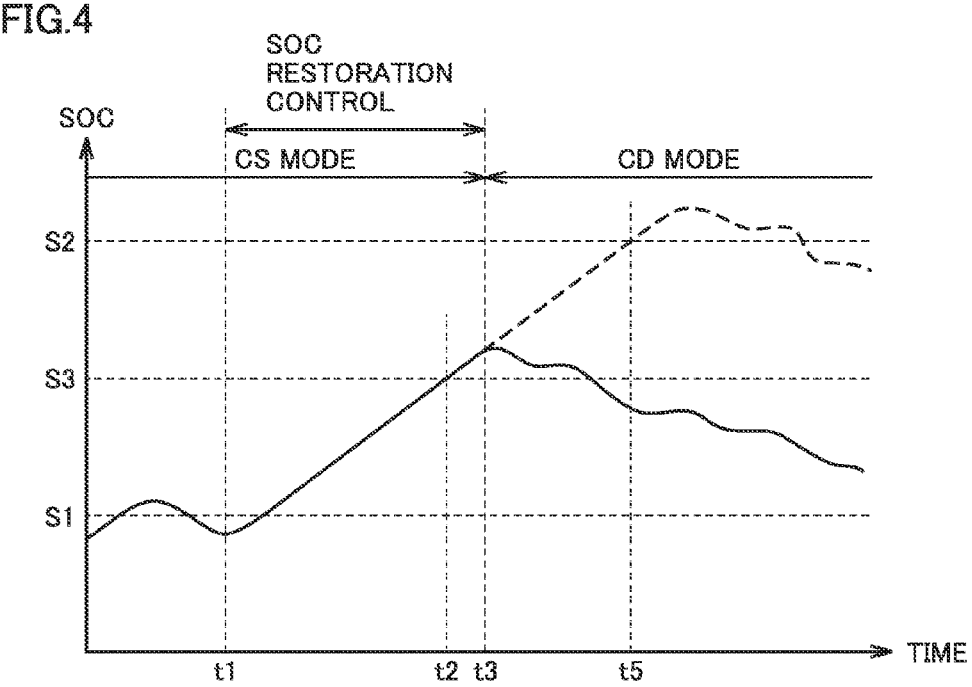
FIG. 4 is a diagram representing one example of a change in the SOC in the present first embodiment when the SOC restoration switch is operated during the CS mode being selected.

FIG. 4 is a diagram representing one example of a change in the SOC in the present first embodiment when SOC restoration switch 28 is operated during the CS mode being selected. Referring to FIG. 4, as with the case of FIG. 3, it is assumed that SOC restoration switch 28 is operated by a user at time t1 during the CS mode being selected.

When SOC restoration switch 28 is operated, the SOC restoration control is executed, and the SOC of power storage device 16 is raised. Here, in this first embodiment, when an increase in the SOC is requested by means of SOC restoration switch 28, the threshold value of the SOC allowing the switching from the CS mode to the CD mode (CD mode allowance SOC threshold value) is lowered from value S2 to value S3 (S2>S3>S1).

Then, when the SOC of power storage device 16 exceeds threshold value S3 at time t2, the switching from the CS mode to the CD mode is allowed, and it is displayed on display unit 32 (FIG. 1). After that, when a user operates mode switching switch 30 to request switching from the CS mode to the CD mode at time t3, the SOC restoration control is terminated, and the CD mode is selected (solid line).

As described above, when an increase in the SOC is requested by means of SOC restoration switch 28, the threshold value of the SOC allowing switching from the CS mode to the CD mode (CD mode allowance SOC threshold value) is lowered from value S2 to value S3. Accordingly, the switching from the CS mode to the CD mode is allowed in an early stage (time t5→time t2), so that early switching to the CD mode can be achieved.

Figure 5:
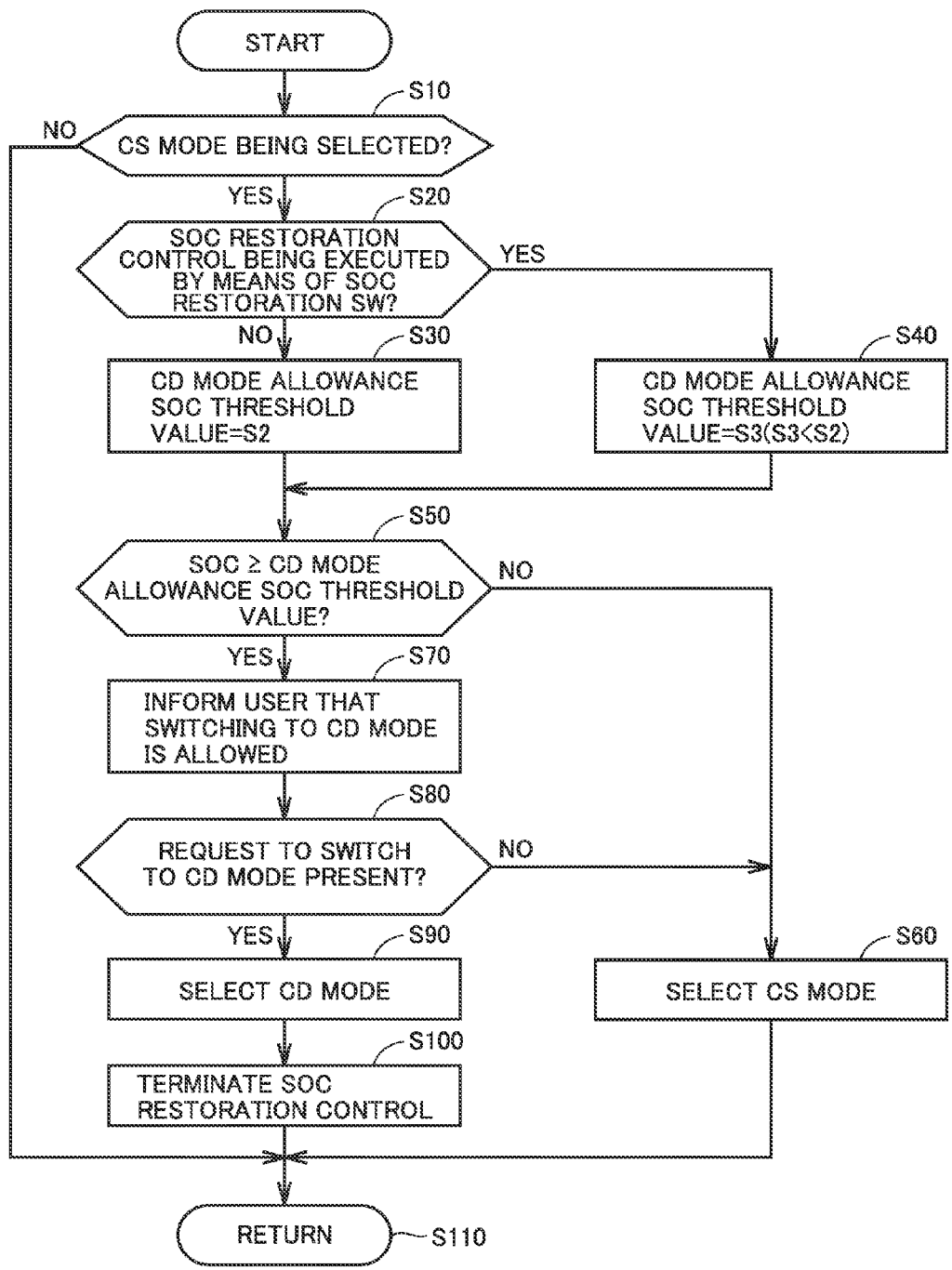
FIG. 5 is a flowchart for illustrating a control executed by an ECU when an increase in the SOC is requested by means of the SOC restoration switch.

FIG. 5 is a flowchart for illustrating a control executed by ECU 26 when an increase in the SOC is requested by means of SOC restoration switch 28. It should be noted that the processing shown in this flowchart is called from a main routine and executed at every predetermined time or at the time when a predetermined condition is met.

Referring to FIG. 5, ECU 26 firstly determines whether or not the CS mode is selected (step S10). When it is determined that the CS mode is not selected (NO in step S10), ECU 26 shifts the processing to step S110 without executing the subsequent series of processing.

When it is determined that the CS mode is selected in step S10 (YES in step S10), ECU 26 determines whether or not the SOC restoration control in accordance with an operation of SOC restoration switch 28 is being executed (step S20). When the SOC restoration control is not being executed (NO in step S20), ECU 26 sets the CD mode allowance SOC threshold value to be value S2 (step S30).

On the other hand, when it is determined that the SOC restoration control is being executed in step S20 (YES in step S20), ECU 26 sets the CD mode allowance SOC threshold value to be value S3 which is smaller than value S2 (step S40). In other words, while the SOC restoration control in accordance with the operation of SOC restoration switch 28 is being executed, the CD mode allowance SOC threshold value is lowered from value S2 to value S3.

Next, ECU 26 determines whether or not the SOC (current value) of power storage device 16 is greater than or equal to the CD mode allowance SOC threshold value (step S50). When the SOC is smaller than the CD mode allowance SOC threshold value (NO in step S50), ECU 26 maintains selection of the CS mode (step S60).

In step S50, when it is determined that the SOC is greater than or equal to the CD mode allowance SOC threshold value (YES in step S50), ECU 26 outputs a control signal to display unit 32 (FIG. 1), and display unit 32 informs a user about allowance of switching to the CD mode in accordance with the control signal (step S70).

Next, ECU 26 determines whether or not a request to switch to the CD mode is present (step S80). For example, when switching to the CD mode is requested by means of mode switching switch 30, it is determined that the request to switch to the CD mode is present. Alternatively, when it is set so that the CD mode is automatically selected when the SOC is raised to a termination threshold value the SOC restoration control, it may be determined that the request to switch to the CD mode is present when the SOC is raised to the above-described termination threshold value.

Then, when it is determined that the request to switch to the CD mode is present in step S80 (YES in step S80), ECU 26 selects the CD mode (step S90). Moreover, when the SOC restoration control is being executed, ECU 26 terminates the SOC restoration control (step S100). On the other hand, when it is determined that the request to switch to the CD mode is not present in step S80 (NO in step S80), the processing is shifted to step S60, and the CS mode is selected (maintained).

As described above, in this first embodiment, when an increase in the SOC is requested by means of SOC restoration switch 28, the SOC restoration control is executed, and the CD mode allowance SOC threshold value is lowered from value S2 to value S3. Accordingly, the switching from the CS mode to the CD mode is allowed in an early stage. Thus, according to this first embodiment, when an increase in the SOC is requested by means of SOC restoration switch 28, switching to the CD mode in an early stage can be achieved.

Modified Example

In the first embodiment, when the SOC is greater than or equal to the CD mode allowance SOC threshold value, and the request to switch to the CD mode (for example the switching request by means of mode switching switch 30) is present, the CD mode is selected, and the SOC restoration control is terminated. In place of this, when the SOC is greater than or equal to the CD mode allowance SOC threshold value, and the SOC restoration control is terminated (for example, a user performs an operation to turn off SOC restoration switch 28), the CD mode may be selected.

Figure 6:
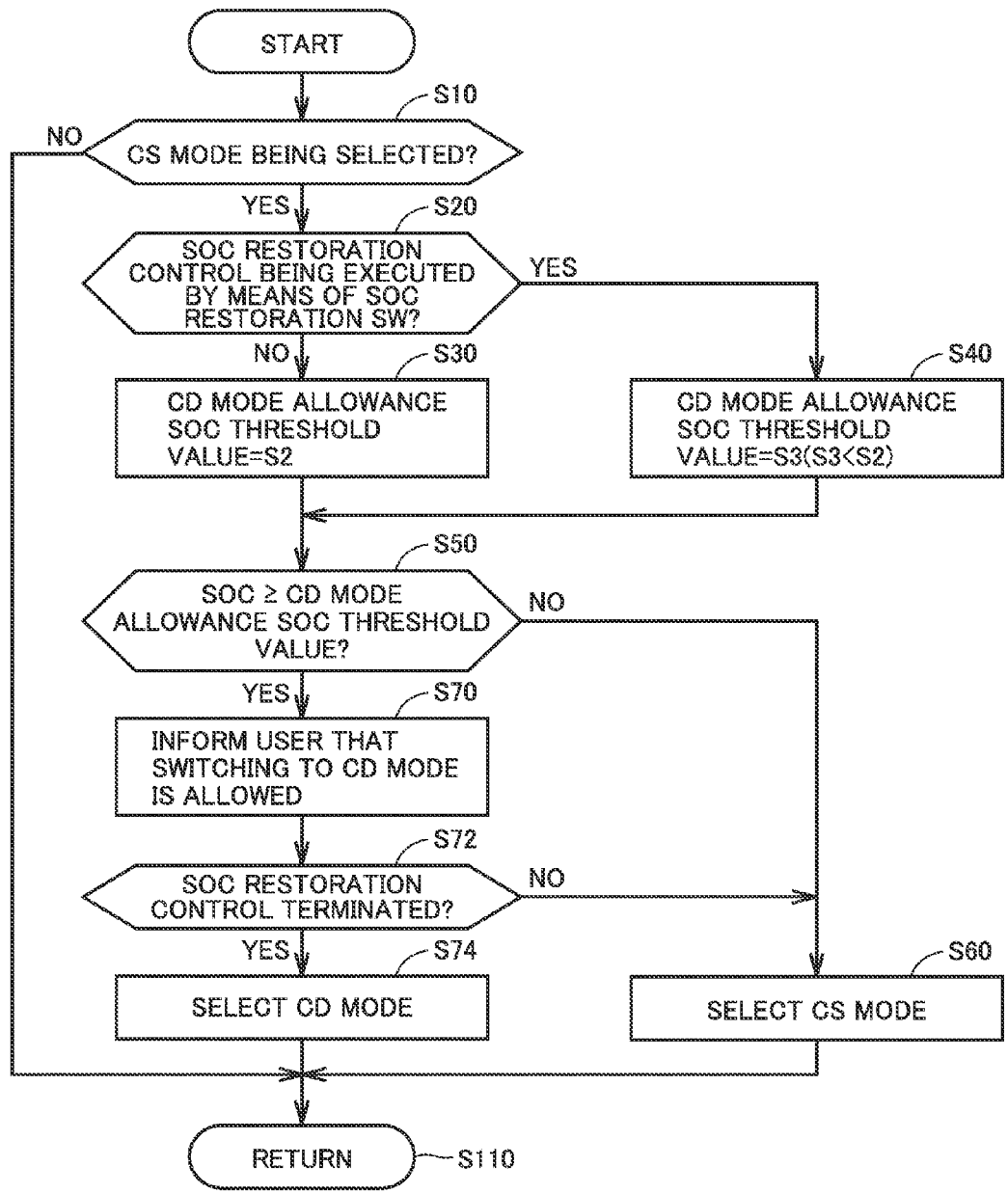
FIG. 6 is a flowchart for illustrating a control executed by the ECU in a modified example when an increase in the SOC is requested by means of the SOC restoration switch.

FIG. 6 is a flowchart for illustrating a control executed by ECU 26 in this modified example when an increase in the SOC is requested by means of SOC restoration switch 28. It should be noted that the processing shown in this flowchart is also called from a main routine and executed at every predetermined time or at the time when a predetermined condition is met.

Referring to FIG. 6, this flowchart includes steps S72, S74 in place of steps S80, S90, S100 in the flowchart shown in FIG. 5. In other words, in step S70, when the allowance to switch to the CD mode is informed to a user by means of display unit 32, ECU 26 determines whether or not the SOC restoration control is terminated (step S72). For example, when a user performs an operation to turn off SOC restoration switch 28, or when the SOC is raised to a termination threshold value of the SOC restoration control, it is determined that the SOC restoration control is terminated.

Then, when it is determined that the SOC restoration control is terminated (YES in step S72), ECU 26 selects the CD mode (step S74). On the other hand, when it is determined that the SOC restoration control is not terminated in step S72 (NO in step S72), the processing is shifted to step S60, and the CS mode is selected (maintained). It should be noted that, also in the case where the SOC restoration control is not originally executed, the processing is shifted to step S60, and the CS mode is selected (maintained).

Also with this modified example, the same effect as that of the first embodiment can be obtained.

Second Embodiment

In the first embodiment and its modified example, when the SOC restoration control is executed by means of SOC restoration switch 28, the CD mode allowance SOC threshold value is lowered from value S2 to value S3. Then, when the SOC is greater than or equal to the CD mode allowance SOC threshold value and switching to the CD mode is requested by means of mode switching switch 30, the mode is switched to the CD mode, and the SOC restoration control is terminated. Alternatively, when the SOC is greater than or equal to the CD mode allowance SOC threshold value and the operation to turn off SOC restoration switch 28 is performed, the mode is switched to the CD mode, and the SOC restoration control is terminated.

In this second embodiment, termination of the SOC restoration control is performed by the operation to turn off SOC restoration switch 28, and the switching from the CS mode to the CD mode is performed by means of mode switching switch 30. In other words, when the SOC is greater than or equal to the CD mode allowance SOC threshold value, and SOC restoration switch 28 is turned off, the SOC restoration control is terminated, but the mode is not switched to the CD mode in response to the termination of the SOC restoration control, and the CS mode is maintained.

In this case, since the SOC restoration control is terminated, the CD mode allowance SOC threshold value is restored to value S2, so that the switching to the CD mode in an early stage cannot be achieved. Therefore, in hybrid vehicle 100 in accordance with this second embodiment, even in a period in which an increase in the SOC is not requested by means of SOC restoration switch 28, when a history of a request to increase the SOC by means of SOC restoration switch 28 is present after the switching from the CD mode to the CS mode, the CD mode allowance SOC threshold value is lowered from value S2 to value S3. Accordingly, mode switching is achieved which reflects intention of a user who requests switching to the CD mode in an early stage.

Figure 7:
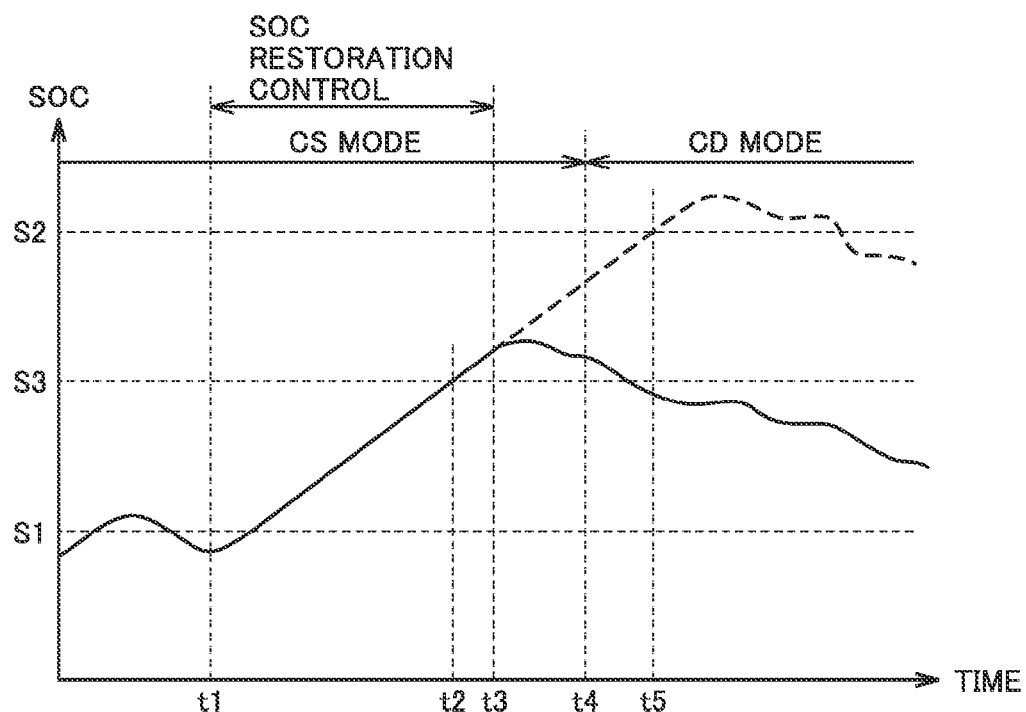
FIG. 7 represents one example of a change in the SOC in a second embodiment.

FIG. 7 represents one example of a change in the SOC in this second embodiment. FIG. 7 corresponds to above-described FIGS. 3 and 4. Referring to FIG. 7, as with the cases of FIGS. 3 and 4, SOC restoration switch 28 is operated by a user at time t1 during the CS mode being selected.

At time t2, when the SOC reaches threshold value S3, switching from the CS mode to the CD mode is allowed, and it is displayed on display unit 32 (FIG. 1). After that, when SOC restoration switch 28 is turned off at time t3, the SOC restoration control is terminated, but the mode is not switched to the CD mode in response to termination of the SOC restoration control, and the CS mode is maintained.

After time t3, the CD mode allowance SOC threshold value does not return to value S2 with termination of the SOC restoration control, and presence of the history of the request to increase the SOC by means of SOC restoration switch 28 causes the CD mode allowance SOC threshold value to be set to value S3. Then, at time t4, when a user operates mode switching switch 30 to request switching from the CS mode to the CD mode, the CD mode is selected (solid line).

The entire configuration of the hybrid vehicle in accordance with this second embodiment is the same as that of hybrid vehicle 100 shown in FIG. 1.

Figure 8:
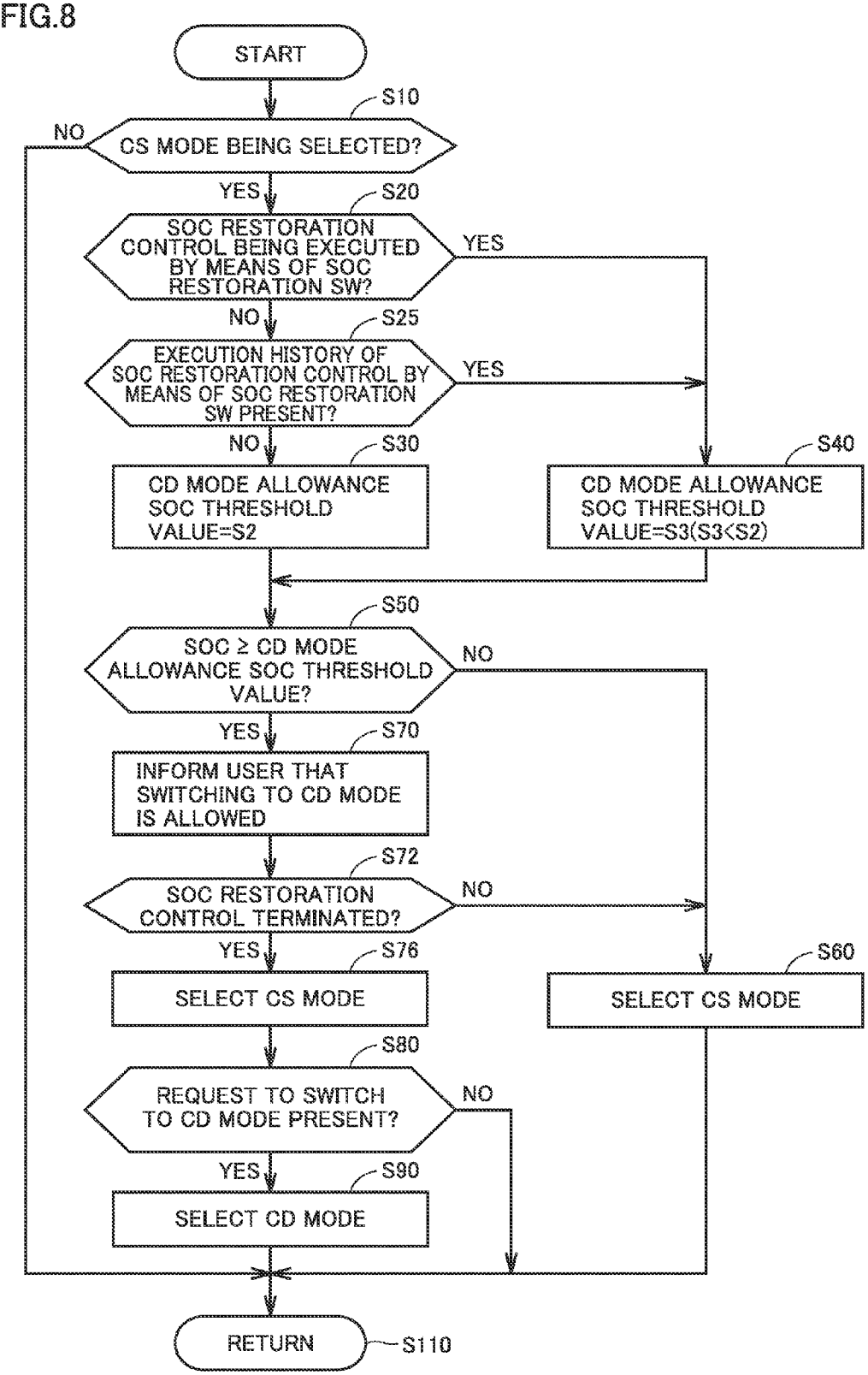
FIG. 8 is a flowchart for illustrating a control executed by the ECU in the second embodiment when an increase in the SOC is requested by means of the SOC restoration switch.

FIG. 8 is a flowchart for illustrating a control executed by ECU 26 in the second embodiment when an increase in the SOC is requested by means of SOC restoration switch 28. It should be noted that the processing shown in this flowchart is also called from a main routine and executed at every predetermined time or at the time when a predetermined condition is met.

Referring to FIG. 8, this flowchart further includes step S25 and replaces step S74 with steps S76, S80, S90 in the flowchart shown in FIG. 6. In other words, in step S20, when it is determined that the SOC restoration control is not being executed in accordance with an operation of SOC restoration switch 28 (NO in step S20), ECU 26 determines whether or not an execution history of the SOC restoration control by means of SOC restoration switch 28 after previous switching from the CD mode to the CS mode is present (step S25).

When it is determined that the execution history of the SOC restoration control is not present in step S25 (NO in step S25), the processing is shifted to step S30, and ECU 26 sets the CD mode allowance SOC threshold value to be value S2. On the other hand, when it is determined that the execution history of the SOC restoration control is present in step S25 (YES in step S25), the processing is shifted to step S40, and ECU 26 sets the CD mode allowance SOC threshold value to be value S3 which is smaller than value S2.

When the CD mode allowance SOC threshold value is set in step S30 or S40, it is determined whether or not the SOC (current value) is greater than or equal to the CD mode allowance SOC threshold value in step S50. Then, when the SOC is greater than or equal to the CD mode allowance SOC threshold value (YES in step S50), allowance to switch to the CD mode is informed to a user by means of display unit 32 in step S70. Next, in step S72, it is determined whether or not the SOC restoration control is terminated.

Then, in this second embodiment, when it is determined that the SOC restoration control is terminated in step S72 (YES in step S72), ECU 26 selects (maintains) the CS mode (step S76).

After that, ECU 26 determines whether or not the request to switch to the CD mode is present (step S80), and when it is determined that the request to switch to the CD mode is present (YES in step S80), ECU 26 selects the CD mode (step S90). On the other hand, when it is determined that the request to switch to the CD mode is not present in step S80 (NO in step S80), the processing is shifted to step S110, and the CS mode is maintained.

As described above, in this second embodiment, after the SOC restoration control is terminated, the CS mode is selected (maintained), and the mode is switched to the CD mode by means of mode switching switch 30. At this time, although the SOC restoration control by means of SOC restoration switch 28 is not executed, since the history of the request to increase the SOC by mean of SOC restoration switch 28 is present after the previous switching from the CD mode to the CS mode, the CD mode allowance SOC threshold value is lowered from value S2 to value S3. Thus, also with this second embodiment, when an increase in the SOC is requested by means of SOC restoration switch 28, switching to the CD mode in an early stage can be achieved.

It should be noted that, although the control in hybrid vehicle 100 (FIG. 1) having a configuration in which engine 2 and two motor generators 6, 10 are coupled to power split device 4 is described in each embodiment described above, a hybrid vehicle to which the present invention is applied is not limited to the one having such a configuration.

For example, as shown in FIG. 9, the control described in each embodiment described above can be applied also to hybrid vehicle 100A having the configuration in which engine 2 and one motor generator 10 are coupled in series via clutch 15.

Moreover, although it is not particularly illustrated, the present invention can be applied also a so-called series-type hybrid vehicle, which uses engine 2 to drive motor generator 6 and generates a driving force of a vehicle only with motor generator 10.

Moreover, in each embodiment described above, hybrid vehicle 100 (100A) is a hybrid vehicle capable of externally charging power storage device 16 by means of the external power supply. However, the present invention can be applied also to a hybrid vehicle having no external charging mechanism (power converter 23 and connection portion 24). The CD mode and CS mode are suitable for the hybrid vehicle capable of performing the external charging, but are not limited only to the hybrid vehicle capable of performing the external charging.

It should be noted that, in the description above, engine 2 corresponds to one example of the "internal combustion engine" in the present invention, and motor generator 10 corresponds to one example of the "motor" in the present invention. Moreover, motor generator 6 corresponds to one example of the "power generating device" in the present invention, and ECU 26 corresponds to one example of the "control device" in the present invention.

Further, SOC restoration switch 28 corresponds to one example of the "input device" in the present invention, and mode switching switch 30 corresponds to one example of the "another input device" in the present invention. Moreover, power converter 23 and connection portion 24 form one example of the "charging mechanism" in the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hybrid vehicle comprising:
   an internal combustion engine;
   a power storage device;
   a motor configured to receive a supply of electric power from the power storage device and generate a traveling driving force;
   a control device configured to perform switching between a CD (Charge Depleting) mode and a CS (Charge Sustaining) mode, the control device allowing switching to the CD mode when a state quantity indicating a state of charge of the power storage device exceeds a threshold value during the CS mode;
   a power generating device configured to generate charging power for the power storage device by using an output of the internal combustion engine; and
   an input device configured to allow a user to request an increase in a power storage amount of the power storage device,
   when an increase in the power storage amount is requested by means of the input device, the control device executing an increase control that actuates the power generating device to increase the power storage amount,
   the threshold value in a case where an increase in the power storage amount is requested by means of the input device is smaller than the threshold value in a case where an increase in the power storage amount is not requested by means of the input device.

2. The hybrid vehicle according to claim 1, wherein the control device switches the CS mode to the CD mode when the state quantity exceeds the threshold value during the CS mode.

3. The hybrid vehicle according to claim 1, further comprising another input device configured to allow a user to request switching between the CD mode and the CS mode, wherein
   when the state quantity exceeds the threshold value during the CS mode, and when switching from the CS mode to the CD mode is requested by means of the another input device, the control device switches the CS mode to the CD mode.

4. The hybrid vehicle according to claim 1, wherein when the state quantity exceeds the threshold value, and when termination of the request to increase the power storage amount is instructed, the control device terminates the increase control and switches the CS mode to the CD mode.

5. The hybrid vehicle according to claim 1, further comprising a charging mechanism configured to charge the power storage device with use of electric power from a power supply provided outside of the vehicle.

6. A hybrid vehicle comprising:
   an internal combustion engine;
   a power storage device;
   a motor configured to receive a supply of electric power from the power storage device and generate a traveling driving force;
   a control device configured to perform switching between a CD (Charge Depleting) mode and a CS (Charge Sustaining) mode, the control device allowing switching to the CD mode when a state quantity indicating a state of charge of the power storage device exceeds a threshold value during the CS mode;
   a power generating device configured to generate charging power for the power storage device by using an output of the internal combustion engine; and
   an input device configured to allow a user to request an increase in a power storage amount of the power storage device,
   the threshold value in a case where an operation history of the input device is present after previous switching from the CD mode to the CS mode is smaller than the threshold value in a case where an operation history of the input device is not present.

7. The hybrid vehicle according to claim 6, further comprising another input device configured to allow a user to request switching between the CD mode and the CS mode,
   when the state quantity exceeds the threshold value during the CS mode, and when switching from the CS mode to the CD mode is requested by means of the another input device, the control device switches the CS mode to the CD mode.

* * * * *